April 8, 1958 J. G. JARVIS 2,829,691
FORAGE CUTTING UNIT HAVING CUTTING STRIPS
ON COOPERATING DRUM
Filed Nov. 16, 1955 6 Sheets-Sheet 1

Inventor
JAMES G. JARVIS
by: J. Richard Cavanaugh

April 8, 1958 J. G. JARVIS 2,829,691
FORAGE CUTTING UNIT HAVING CUTTING STRIPS
ON COOPERATING DRUM
Filed Nov. 16, 1955 6 Sheets-Sheet 2

Inventor
JAMES G. JARVIS

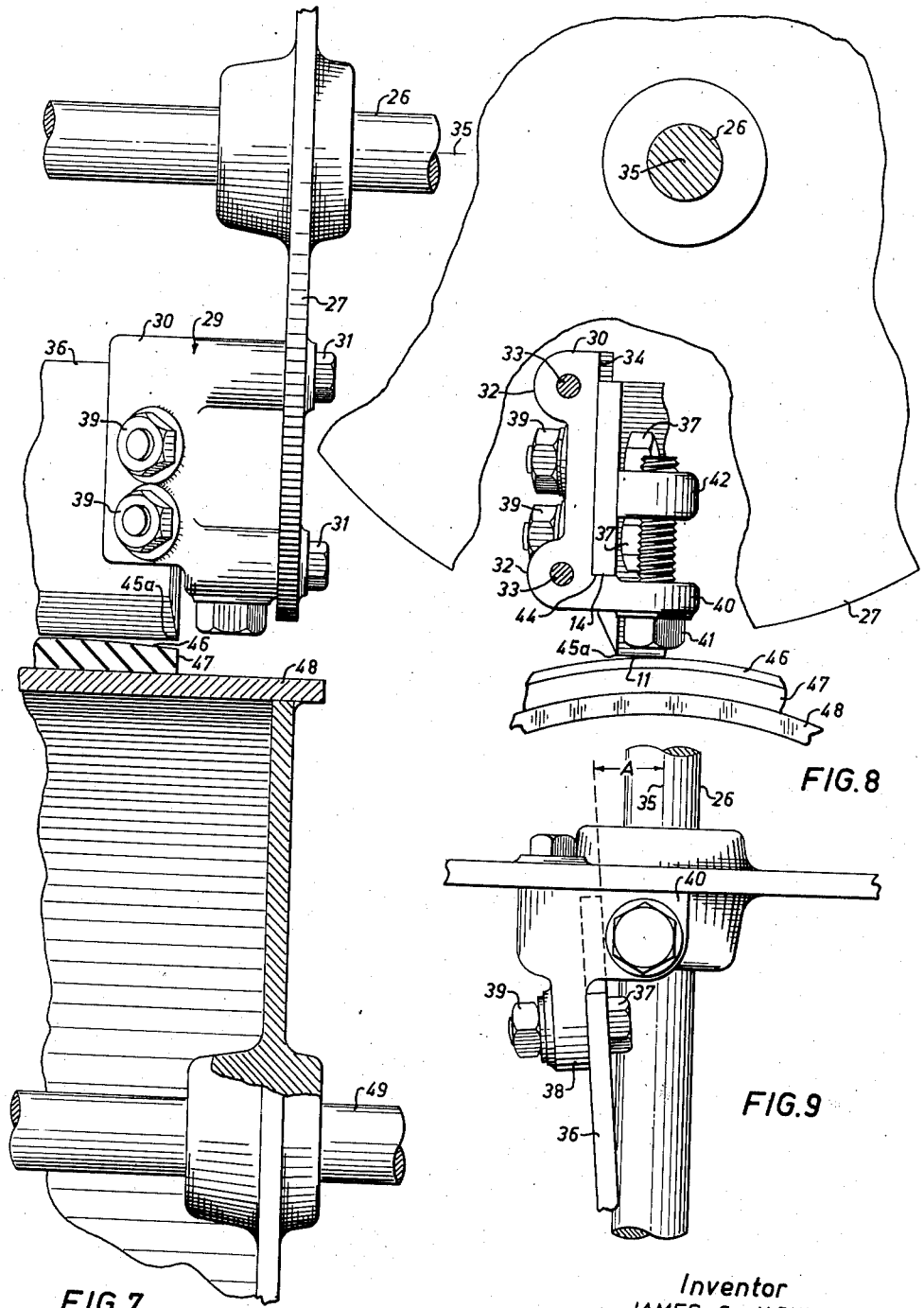

April 8, 1958 J. G. JARVIS 2,829,691
FORAGE CUTTING UNIT HAVING CUTTING STRIPS
ON COOPERATING DRUM
Filed Nov. 16, 1955 6 Sheets-Sheet 5

Inventor
JAMES G. JARVIS
by: J. Richard Cavanagh

United States Patent Office 2,829,691
Patented Apr. 8, 1958

2,829,691

FORAGE CUTTING UNIT HAVING CUTTING STRIPS ON COOPERATING DRUM

James Gordon Jarvis, Meadowvale, Ontario, Canada, assignor to Grasslander Co. Limited, Milverton, Ontario, Canada Application November 16, 1955, Serial No. 547,209

3 Claims. (Cl. 146—117)

This invention relates to a pressure cutting unit adapted for the cutting of straw or like material for livestock feed and more especially to a forage pressure cutting unit having replaceable blades adapted to be installed in various types of agricultural implements for the purposes set forth.

The term "pressure cut" or "pressure cutting" as used in this specification is intended to refer to a type of cut or a cutting action embodying those mechanical principles characterized by the severance of material by a cutting edge moving under pressure through the material to engage a surface supporting the material; that is, the chopping of the material against the supporting surface, as contrasted with the shearing of material between a shearing edge moving past another shearing edge.

One little used form of hay cutting device used up to the middle of the last century, was of the manually driven pressure cutting type and was of a form in which a pressure cutting straw severing blade was carried for rotation about an axle in such manner that the cutting edge was disposed truly parallel in all respects to the rotational axis. The cutting blade was rotated into registry with a cutting strip of brass, zinc or other firm but soft material carried by a drum or the like and penetrated the surface thereof to effect severance of straw impinged between the cutting edge and cutting strip as the drum and cutting knife rotated in opposite directions inwardly to feed the cut material therebetween during the cutting action.

While such manually actuated mechanisms effected an efficient cutting of the straw, it was difficult to sharpen the cutting blade to satisfactory tolerance to conform to complete engagement throughout its length with the co-operating surface of the cutting strip on the co-operating drum. Moreover, there was a tendency to provide such firm engagement of the cutting edge of the knife with the cutting strip that vibration or bumping effect would be accomplished upon each straw severing rotation, causing severe wear of the cutting edge.

So far as applicant is aware, this old form of device was never placed in commercial use in a power-driven form as a hay cutting device. While such device doubtless would work for a short period of time if power driven, it would not seem practical in such a crude form and this may explain the reason for its abandoment in agricultural applications for substantially the past century.

It is a main object of the present invention to provide a cutting unit for agricultural use which is adapted for service under a variety of conditions and which may be easily serviced.

It is a further object of the invention to provide a pressure cutting unit for forage in which the positioning of the cutting edges of the cutting blades is at all times maintained and in which a cutting blade after removal or resharpening may be replaced in accurate positioning without adjustment.

With these and other objects in view, the invention will be appreciated in more detail by reference to the following specification taken in conjunction with the accompanying drawings.

In the drawings:

Figure 7 is an enlarged detail of a portion of a structure similar to that of Figure 6 but having a straight edged cutting blade coacting with a longitudinally convex drum and showing the manner of mounting one end of a pressure cutting blade of the invention;

Figure 8 is an end view of the structure of Figure 7 partially broken away to reveal detail;

Figure 9 is an underside view of the structure of Figure 8;

Figure 1:
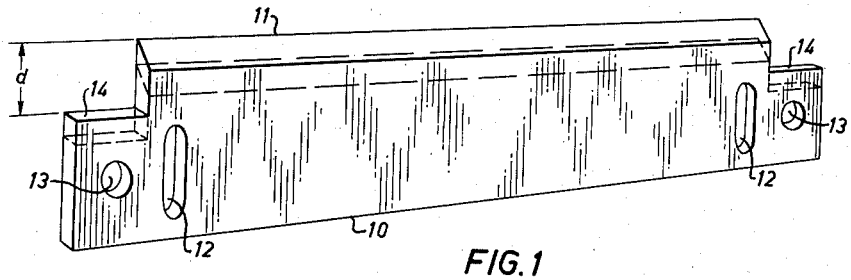
Figure 1 is a perspective view of a preferred form of cutting blade of the invention.

Referring to the drawings and particularly Figure 1, a cutting blade 10 is shown of rectangular form cut from flat steel plate stock and having a straight cutting edge 11 formed longitudinally thereof. The blade 10 carries spaced end slots 12 and adjacent clamping holes or openings 13 by which the blade may be securely mounted in a support therefor disclosed in more detail hereinafter with reference to Figures 6 to 10.

The ends of the blades 10 present locating shoulders 14 spaced a predetermined distance $d$ from the sharpened edge 11 which latter terminates at the leading face 15 of the blade. The invention contemplates the resharpening of the blade 10 in such manner that it may be relocated in its mounting without disturbing the distance relation between the sharpened edge 11 and the mounting (not shown).

Figures 2, 3, 4:
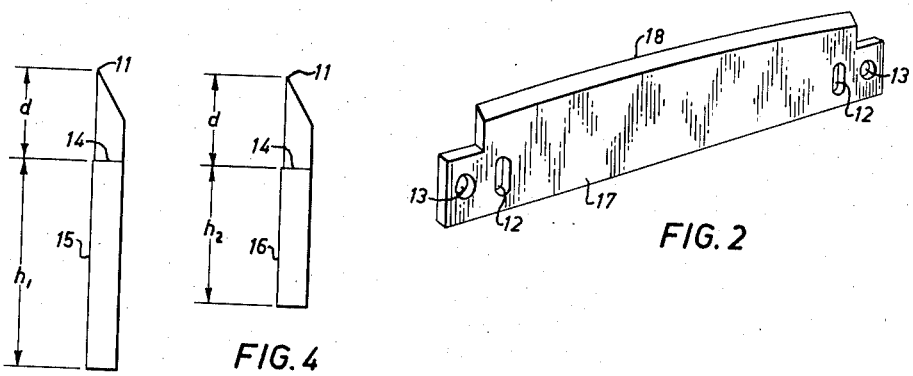
Figure 2 is a view of a modified form of cutting blade of the invention having a curved cutting edge hereinafter defined as substantially straight.
Figure 3 is an enlarged end view of the cutting blade of Figure 1.
Figure 4 is an end view of the cutting blade of Figure 3 after sharpening a number of times.

Thus, in Figures 3 and 4, the sharpened edge 11 is shown spaced a predetermined distance $d$ from the shoulder 14. At each resharpening of the blade 10, the cutting or sharpened edge 11 is again ground to a predetermined distance $d$ from the shoulder 14 as shown in Figure 4 so that finally the body 16 of the blade is of substantially lesser height $h_2$ than the initial height $h_1$ shown in Figure 3. A similar blade to that of Figure 1 is shown in Figure 2 and is designated by the numeral 17. While like numerals designate like components, the change in this form is the convex curvature 18 of the sharpened edge.

While it is preferred to provide a cutting blade having a truly straight edge 11 as shown in Figure 1, the invention also contemplates the provision of a substantially straight edge 18 as shown in Figure 2 adapted to compensate for the longitudinal inclination of the blade when used with a pressure cutting support in the form of a truly cylindrical drum or the like, as set forth hereinafter.

Figure 5:
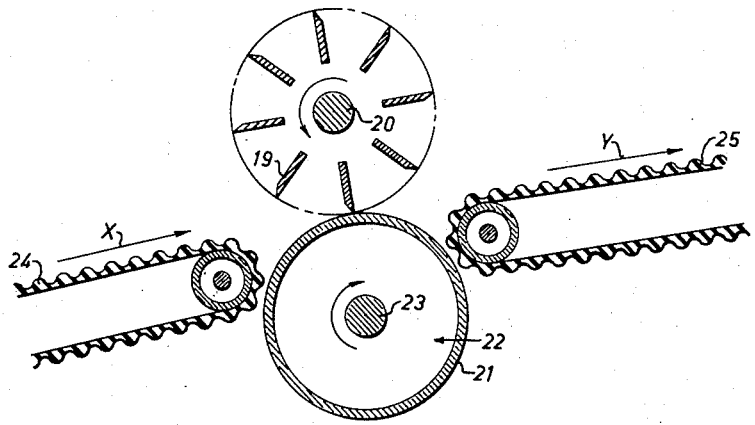
Figure 5 illustrates on a reduced scale a manner of use of the cutting blades of the invention.

In use, a plurality of cutting blades 19 of the invention are supported for rotation relative to axis 20 for pressure contact engagement with a pressure cutting support 21 in the form of a drum-like element 22 rotating on axis 23 so that belt 24 feeding straw or the like in the direction of arrow X projects the straw between the cutting blades 19 and the drum 22 effecting severance of the straw. Conveyor 25 moving in the direction of arrow Y serves to carry cut material away from cutters or blades 19 and drum 22. The mechanism shown in Figure 5 may be incorporated in various types of farm implement, for example, a hay harvester, in which the belt 24 receives straw from a conventional pickup device operatively related thereto (not shown).

The cutting blade of the invention is preferably mounted in the manner shown in Figures 6 to 10. A suitable shaft 26 carries the spaced apart members 27 having fixed thereto the blade carrying left and right hand fittings 28 and 29 as shown in Figures 7 to 10. The fittings 28 and 29 comprise a cast body 30 fastened to the corresponding member 26 or 27 by suitable bolts 31 threaded into enlarged portions 32 of the body as at 33. A blade supporting face 34 is provided on the body and is inclined longitudinally relative to the axis 35 of shaft 26 as shown in Figure 9 at an angle $a$ preferably of about five degrees. The body and blade supporting surface 34 thereof extend to support the blade 36 by bolts 37 extending through the slots 12 of the blade and suitable holes in the flange portion 38 of the body to be retained by the nuts 39. A clamping bracket 40 projects from the body 30 over the shoulder 14 of the cutting blade and carries a locking bolt 41 adapted to engage in threaded bore 41a of clamping fitting 42 shown in more detail in Figure 10 and carrying a locking stud 43 adapted to tightly seat within the clamping opening 13 of the cutting blade. A blade locating surface 44 is provided in the clamping bracket 40 adjacent the blade supporting surface 34 of the body whereby the shoulder 14 of the cutting blade may be firmly drawn into engagement therewith by means of the clamping bolt 41. After firm location of the blade on its locating shoulder, as set forth, the clamping bolts 37 are tightened to fix the blade relative to the fitting body 30. In this manner, the cutting edge is accurately located relative to the axis of shaft 26. Fitting 28 is of similar design of left hand or opposite inclinations.

Figures 6, 10:
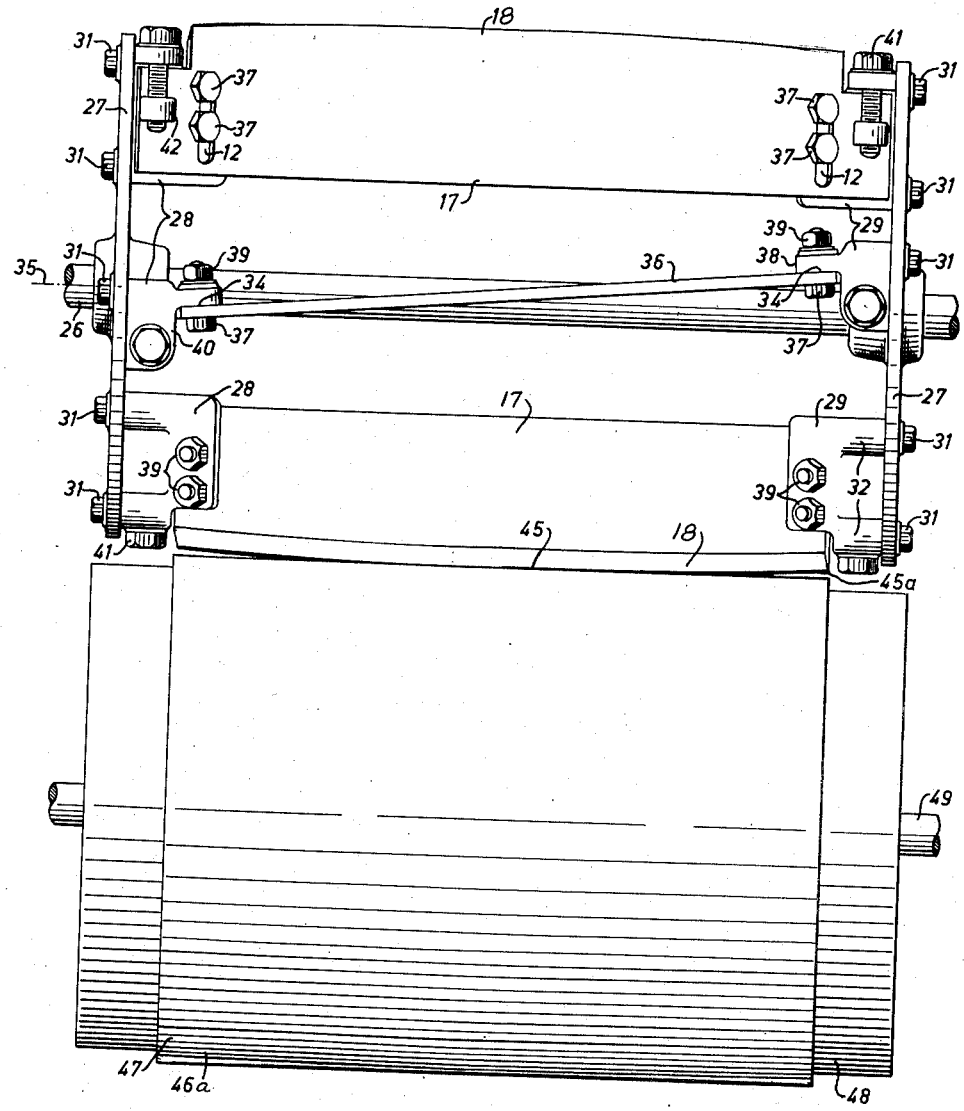
Figure 6 is an elevation of cutting blades of the invention mounted in supporting apparatus and disposed in operative position relative to pressure cut supporting means in this case in the form of a rotatable drum.
Figure 10 is an enlarged perspective view of an adjustable clamping stud of the clamping structure shown in Figures 7 and 8.
Figure 11:
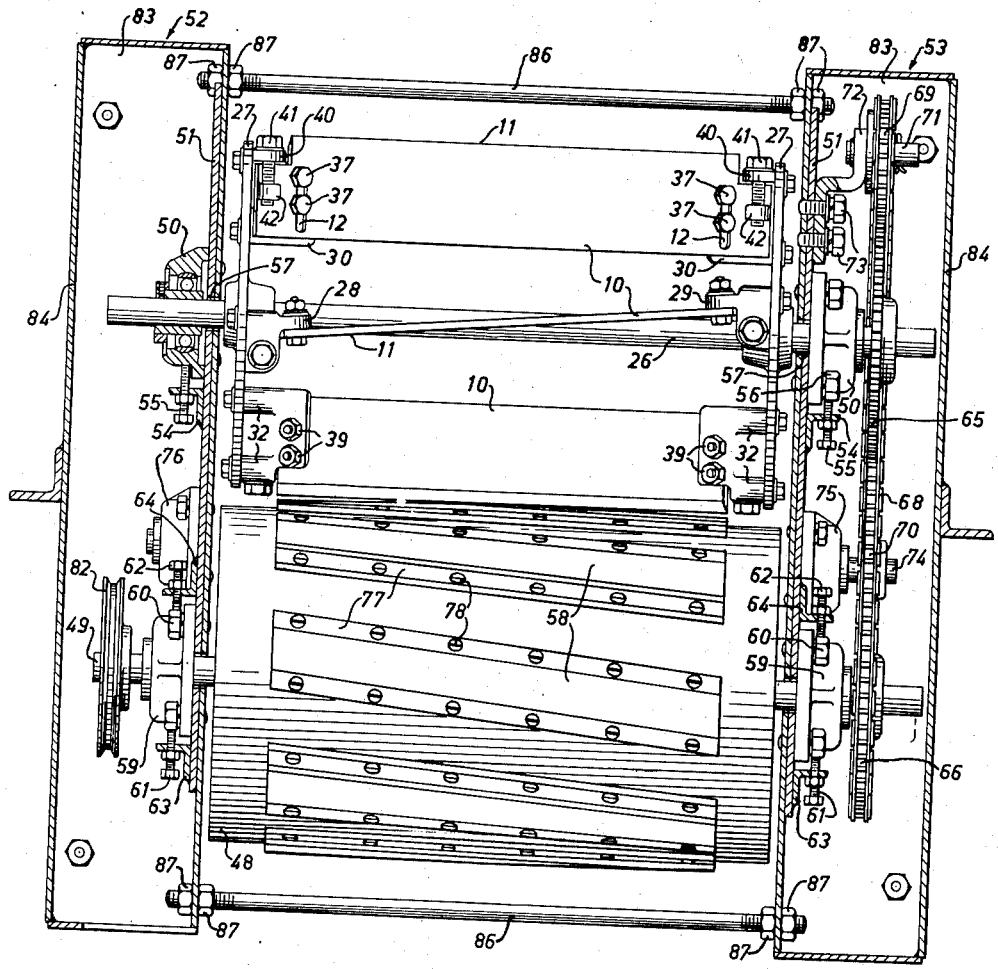
Figure 11 is a sectional elevation of a pressure cutting unit according to the invention and embodying cutting strips adapted to co-act with the pressure cutting blades.

The cutting blades 10 are arranged with their cutting edges radially equidistant from the axis of shaft 26 at a point intermediate the spaced apart supporting members 27. Thus the lowermost blade shown in Figure 6 is shown in contact at a mid-point 45 with the surface 46 on a pressure cutting support 47, on drum 48 rotatable on supporting shaft 49 disposed in parallel spaced apart relation to shaft 26. In the form of the invention illustrated in Figure 7, the cutting edges 11 of the blades 10 being straight and the blades being inclined longitudinally at an angle with respect to the axis of the shaft 26, the radial distance of the cutting edge 11 at the ends 45a thereof from the axis 35 of shaft 26 will be greater than at the point 45. The pressure cutting support 47 is provided in the form of a rubber or other elastomer body vulcanized or cemented to the cylindrical drum 48. The longitudinally convex surface 46 is formed by cutting the body to the desired contour, such contour being of a shape conforming to that generated by the cutting edges of the cutting blades 10 during rotation thereof.

It is contemplated that the generally flat rectangular pressure cutting blades of the invention may be returned to the factory or to a service point for resharpening, in which case the provision of a cutting edge of slight curvature such as is indicated in Figure 2, is practical and enables the use of a pressure cutting supporting surface of simple cylindrical form 46a as shown in Figure 6. Obviously a slightly curved edge requires the use of special grinding equipment whereas the straight cutting edge of the preferred form enables the sharpening of the cutting blade to satisfactory tolerance with conventional power grinding equipment.

By reason of the support of the cutting blades preferably at a longitudinally inclined angle, the blade effects a pressure cutting action at progressive increments along its length so that at any one point of time the necessary power consumed in the cutting action is a minimum. It will be understood, however, that the cutting blade of the invention may be formed and supported in the manner shown but in longitudinal alignment with the axis of rotation thereof without departing from the invention.

In Figures 11 to 14, like numerals indicate like components of the previous figures. Shaft 26 is suitably journalled in bearings 50 mounted on the inner side walls 51 of the side housings 52 and 53. Brackets 54 support adjusting screws 55 engaging the lower surfaces of the housings of bearings 50 whereby the latter may be adjusted slightly relative to the side walls 51 by reason of slots provided in the bearings (not shown) to accommodate the mounting bolts 56 permitting shaft 26 to be adjusted upwardly or downwardly in the enlarged holes 57 of the side walls. A similar arrangement is provided in the mounting of shaft 49 supporting the drum 48 which, in this case, carries cutting strips 58 supported thereon for engagement by the cutting blades 10. The bearing housings 59, however, are adjustable both upwardly and downwardly, upon loosening of mounting bolts 60, by means of adjusting screws 61 and 62 supported by brackets 63 and 64 respectively. By this means, shaft 49 may be aligned in desired parallel spaced apart relationship with respect to shaft 26.

Figure 14:
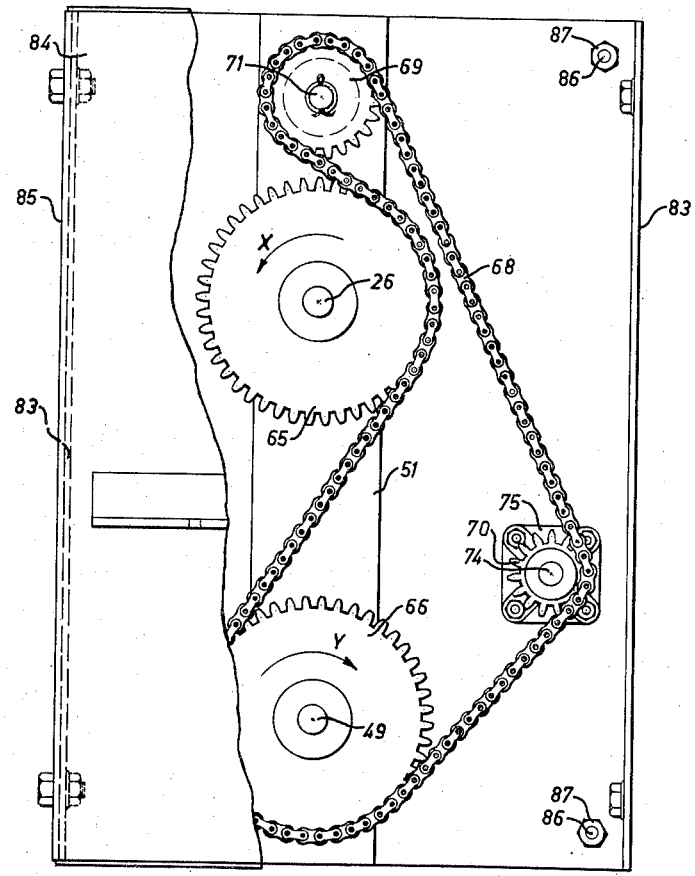
Figure 14 is a side elevation of the cutting unit of the invention with a side cover removed to reveal drive mechanism.

As shown in Figure 14, shafts 26 and 49 carry sprockets 65 and 66 of such relative size that the peripheral speed of cutting edges 11 of blades 10 will be the same as the peripheral speed of the pressure cutting supporting surfaces 67 of the cutting strips 58. Thus, where the surfaces 67 are formed to move on a much larger radius of rotation than the cutting edges 11 as may be preferred for the cutting of difficult materials, for example, alfalfa of high moisture content, then the sprockets 65 and 66 must be of such relative effective diameter each with respect to the other, that the peripheral speeds of surfaces 67 of the cutting strips and the blade cutting edges 11 are identical and in synchronization. The pressure cutting unit disclosed herein embodies operatively relating drive means to effect the necessary synchronization by a chain 68 shown passing about the two idler sprockets 69 and 70 in a manner effecting opposite directions of rotation X and Y of shafts 26 and 49. Idler sprocket 69 is supported on stud shaft 71 of adjustable bracket 72 fastened by bolts 73 on the inner wall 51 of the side housing 53. Idler sprocket 70 is preferably fastened to a shaft 74 passing through a bearing 75 and extending for support in a corresponding bearing 76 on the opposite inner wall 51 of the other side housing 52.

Figure 12:
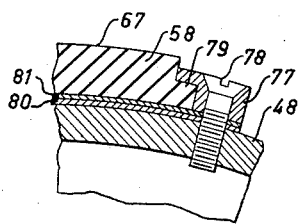
Figure 12 is a partial sectional view of a cutting strip illustrating the manner of mounting same in the apparatus of Figure 11.
Figure 13:
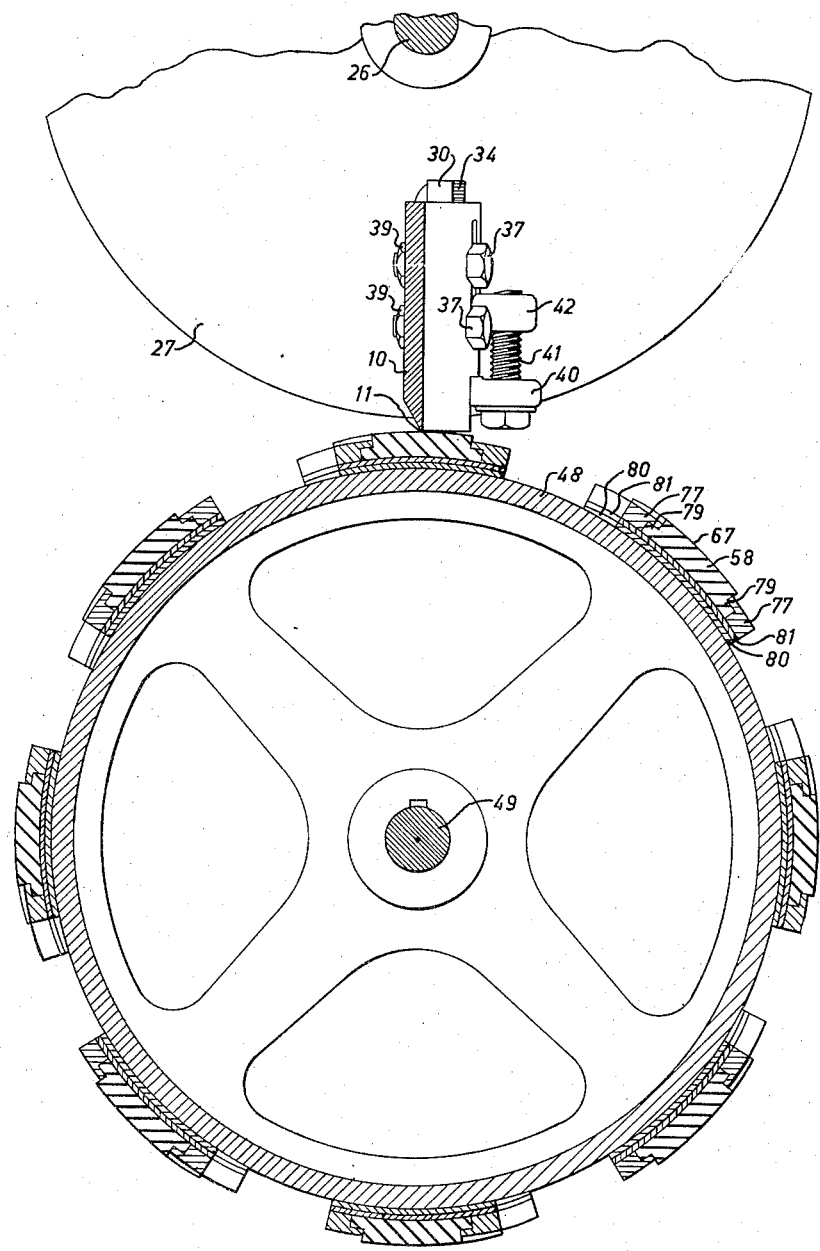
Figure 13 is a partial median sectional view of the apparatus of Figure 11 revealing the relation of the cutting strips to the cutting knives, one of the latter only being shown.

The cutting strips may be formed of any suitable material such as rubber, scrap rubber belting, bamboo, resin impregnated materials and other non-abrasive preferably elastomer-like substances. It is preferred that the cutting strips be initially straight and that they be drawn to the contour of the drum by means of clamping strips 77 fastened to the drum 48 by means of suitable screws 78 adapted to grip the flanges 79 of the cutting strips 58 substantially as shown in Figure 12. Preferably, shim strips 80 and 81 are inserted under each cutting strip to compensate for wear in the pressure cutting supporting surfaces 67 thereof.

The replaceable cutting strips are longitudinally inclined to correspond with the longitudinal inclination of the cutting blades 10. Where the cutting blades are characterized by straight cutting edges 11 as shown in Figure 1, the cutting strips are contoured while mounted on the drum in a lathe or more crudely by filing or the like to provide a contoured surface having a curvature defined by a surface generated by rotation of the cutting edges of the cutting blades about their axis of a form which may be defined as longitudinally convex herein. However, if a convex cutting edge 18 is provided on the cutting blade as illustrated in Figure 2, then the cutting strip surfaces 67 may be truly cylindrical; that is, may geometrically form a part of a cylindrical surface about the axis of shaft 49. It will be apparent that the use of shim strips and the shaping of the outer surface of the cutting strip, enables local adjustment of the engagement of a portion of the cutting edge of a cutting blade with the surface of the cutting strip which, in addition to the accurate location of the cutting blade edges by reason of the locating shoulders as above described, enables the maintenance of precision of the cutting action upon blade replacement or resharpening to compensate for wear or damage.

Either shaft 26 or shaft 49 may carry a pulley wheel or sprocket 82 adapted for drive connection by means of a belt or chain (not shown) to a suitable drive motor. The side housings 52 and 53 embody outwardly directed walls 83 to which are bolted the side covers 84 carrying overlapping mounting flanges 85 welded thereto. Suitable spacers in the forms of rods 86 extend between the inner side walls 51 at convenient locations substantially as shown and are fastened thereto by means of nuts 87. In the construction shown, one complete side housing may be removed without disturbing the remaining components of the unit in the other side housing. Likewise, other components of the device shown may be serviced without requiring substantial disassembly of the remainder of the unit.

What I claim as my invention is:

1. A forage pressure cutting unit for cutting straw and like material, comprising in combination: a flat generally rectangular cutting blade body; a straight pressure cutting edge formed longitudinally on said body and extending substantially the full length thereof; a bracket for each end of said body; a rotatable cutter shaft having means thereon supporting said brackets and said blade for rotation about the rotary axis thereof with the cutting edge of said blade disposed outwardly, the terminal ends of said cutting edge being located equidistant from the rotational axis of said shaft; a support for each end of said cutter shaft; a pressure cutting supporting member supported by said cutter shaft supporting means and movable on a curved path having an axis of curvature parallel to but spaced from the rotational axis of said cutter shaft; means operatively relating said cutter shaft and said pressure cutting supporting member; a cutting strip forming a part of said pressure cutting supporting member and synchronized by said operatively relating means for co-operative cutting action with said cutting edge; and a pressure cutting supporting surface on said cutting strip having a contour of longitudinal convexity, said cutting edge being inclined longitudinally with respect to the rotational axis thereof.

2. A forage pressure cutting unit for cutting straw and like material, comprising in combination: a flat generally rectangular cutting blade body; a substantially straight pressure cutting edge formed longitudinally on said body and extending substantially the full length thereof; a bracket for each end of said body; cutting edge locating means on each end of said blade body adjacent the cutting edge thereof but spaced a predetermined fixed distance therefrom; a locating surface on said bracket engageable by said locating means of said blade body for predetermined positioning of said cutting edge with respect to said bracket; a rotatable cutter shaft having means thereon supporting said brackets and said blade for rotation about the rotary axis thereof with the cutting edge of said blade disposed outwardly, the terminal ends of said cutting edge being located equidistant from the rotational axis of said shaft; a support for each end of said cutter shaft; a pressure cutting supporting member supported by said cutter shaft supporting means and movable on a curved path having an axis of curvature parallel to but spaced from the rotational axis of said cutter shaft; means operatively relating said cutter shaft and said pressure cutting supporting member; a cutting strip forming a part of said pressure cutting supporting member and synchronized by said operatively relating means for co-operative cutting action with said cutting edge; means for removably clamping said cutting strip to said pressure cutting supporting member; and means for adjusting the closest proximity of said cutting strip to the cutting edge of said blade during co-operative cutting action therewith.

3. A forage pressure cutting unit for cutting straw and like material, comprising in combination: a flat generally rectangular cutting blade body; a substantially straight pressure cutting edge formed longitudinally on said body and extending substantially the full length thereof; a bracket for each end of said body; cutting edge locating means on each end of said blade body adjacent the cutting edge thereof but spaced a predetermined fixed distance therefrom; a locating surface on said bracket engageable by said locating means of said blade body for predetermined positioning of said cutting edge with respect to said bracket; a rotatable cutter shaft having means thereon supporting said brackets and said blade for rotation about the rotary axis thereof with the cutting edge of said blade disposed outwardly, the terminal ends of said cutting edge being located equidistant from the rotational axis of said shaft; a support for each end of said cutter shaft; a pressure cutting supporting member supported by said cutter shaft supporting means and movable on a curved path having an axis of curvature parallel to but spaced from the rotational axis of said cutter shaft; means operatively relating said cutter shaft and said pressure cutting supporting member; a cutting strip forming a part of said pressure cutting supporting member and synchronized by said operatively relating means for co-operative cutting action with said cutting edge; means for removably clamping said cutting strip to said pressure cutting supporting member; and means for adjusting the closest proximity of said cutting strip to the cutting edge of said blade during co-operative cutting action therewith, said adjusting means being in the form of a shim strip between said cutting strip and said pressure cutting supporting member.

References Cited in the file of this patent

UNITED STATES PATENTS

| | | |
|---|---|---|
| None | Greene | Aug. 8, 1833 |
| 61,933 | Gale | Feb. 12, 1867 |
| 216,486 | Murray et al. | June 10, 1879 |
| 1,420,021 | Davidson | June 20, 1922 |
| 1,929,586 | Holland-Letz | Oct. 10, 1933 |
| 2,007,731 | Tomlin | July 9, 1935 |
| 2,399,529 | Willits | Apr. 30, 1946 |
| 2,579,615 | Sabo | Dec. 25, 1951 |
| 2,598,820 | Neese | June 3, 1952 |
| 2,716,318 | Skromme | Aug. 30, 1955 |
| 2,735,469 | West | Feb. 21, 1956 |

UNITED STATES PATENT OFFICE
Certificate of Correction

Patent No. 2,829,691                        April 8, 1958

James Gordon Jarvis

It is hereby certified that error appears in the above numbered patent requiring correction and that the said Letters Patent should read as corrected below.

In the grant, lines 2 and 3, for "assignor to Grasslander Co. Limited, of Milverton, Ontario, Canada," read —assignor, by mesne assignments, to Grasslander (1957) Limited, of Milverton, Ontario, Canada,—; line 12 for "Grasslander Co. Limited, its successors" read —Grasslander (1957) Limited, its successors—; in the heading to the printed specification, lines 4 to 6, for "assignor to Grasslander Co. Limited, Milverton, Ontario, Canada" read —assignor, by mesne assignments, to Grasslander (1957) Limited, Milverton, Ontario, Canada—.

Signed and sealed this 18th day of November 1958.

[SEAL]

Attest:
KARL H. AXLINE,
*Attesting Officer.*

ROBERT C. WATSON,
*Commissioner of Patents.*